March 5, 1946.　　R. R. WATERMAN　　2,396,032

BOILER

Filed July 5, 1941　　3 Sheets-Sheet 1

INVENTOR:
RUSSELL R. WATERMAN,
BY
ATTORNEYS.

March 5, 1946.    R. R. WATERMAN    2,396,032
BOILER
Filed July 5, 1941    3 Sheets-Sheet 2

INVENTOR:
RUSSELL R. WATERMAN,
BY
ATTORNEYS.

March 5, 1946. R. R. WATERMAN 2,396,032
BOILER
Filed July 5, 1941 3 Sheets-Sheet 3

INVENTOR:
RUSSELL R. WATERMAN
BY
ATTORNEYS.

Patented Mar. 5, 1946

2,396,032

UNITED STATES PATENT OFFICE 2,396,032

BOILER

Russell R. Waterman, Los Angeles, Calif.

Application July 5, 1941, Serial No. 401,107

17 Claims. (Cl. 122—451)

This invention comprehends the provision of an improved system of generating vapor and circulating a vaporizable element in heating and power plants such as steam boilers and hot water and steam heating apparatus, whereby an absolute heat and pressure balance may be maintained without assistance from a prime mover or auxiliary apparatus such as are employed in modern power and heating systems and including means for automatically maintaining circulation of the water and steam as required, elimination of scale, assurance of an adequate and correct supply and quantity of water in the apparatus at all times, maintenance of a correct operating pressure and efficient fuel consumption, as well as other benefits arising from operation.

In the consideration of this invention, it will be understood that in the past various devices and systems have been used which have been intended to provide automatic control of the steam and water circulation and supply and which have failed in efficiency of operation because of fundamental errors in their arrangement for maintaining a proper heat balance and in the provision of an adequate and correctly designed system for circulating and controlling the water and steam supply as well as the requisite pressure for maintaining a plant in economical operation.

I have ascertained from experimentation that my improved system, considered as a self contained unit, in which all of the necessary elements are properly grouped and interconnected, operates to provide and maintain an inherent heat and pressure balance, and, the elements of the system being properly related, eliminates the necessity for external automatic control which is vitally necessary in modern systems of usual design.

An object, therefore, is to provide a steam generating system, the elements of which are so arranged, interconnected and related that a plurality of zones are created in each of which the apparatus is designed to produce certain definite and beneficial effects. One of such zones may be termed as an operating zone, in which there is provided a steam operated water pump and a coil or other boiler element, whereby the water is fed to the coil and in which coil steam is primarily generated under such pressure as may be necessary to operate the pump. Another zone may be provided which in effect is a superheating zone to which heat from a suitable burner is more directly applied than to the coil in the operating zone and from which, when the system is used as a power plant, steam is delivered to a prime mover. Still other zones may be provided of an extent and character and embodying such elements and connections as may be necessary for different uses.

One object is to provide a steam generator in which a closed circuit is maintained within a heat zone as a means of creating differentials in pressure for operating a heater feeding means as well as other auxiliary elements of a system; and, additionally the employment of at least two distinct operating zones as a means of applying energy which is generated in an operating zone.

A particular object is to provide a system and apparatus preferably self contained with all of the necessary elements embodied therein by means of which uniform circulation and steam pressure may be maintained for the operation of a prime mover, including heat control, safety devices, valve mechanisms, thermostatic control of the valves, and interconnections which assure efficient and economical operation under varying conditions and requirements of use with a minimum of attention.

Another object is to provide in a system of the character mentioned a heat control means which eliminates the need for the usual refractory lining of a boiler and incorporates other characteristics which prevents residual storage of heat in the boiler which, under certain operating conditions, is detrimental to the boiler, tubes and other parts; that is to say, the prevention of concentrated heat at spot zones which causes the steam generated at such a zone to force water ahead into the evaporation zone where the drop in temperature thus created causes a thermostat to stop the water feed, thus allowing the boiler to "go dry" in the center, a condition commonly known as priming or surging.

The steam generator employed in my improved system may be of at least two different forms, namely, a flash generator of light weight and with instantaneous steaming characteristics and a recirculating type for heavy duty, and a further object of this invention is to provide modified forms of plant apparatus which are capable of interconnection in various ways for adapting the apparatus to meet the requirements of practically all of the uses of modern steam and hot water generating systems, whereby in all cases an increased efficiency and economy is effected.

Other and more detailed objects of invention will appear as the description of my apparatus progresses.

I have shown in the accompanying drawings several forms of apparatus embodying my improvements, subject, however to modification, with the scope of the appended claims, without departing from the spirit thereof.

Figure 1:
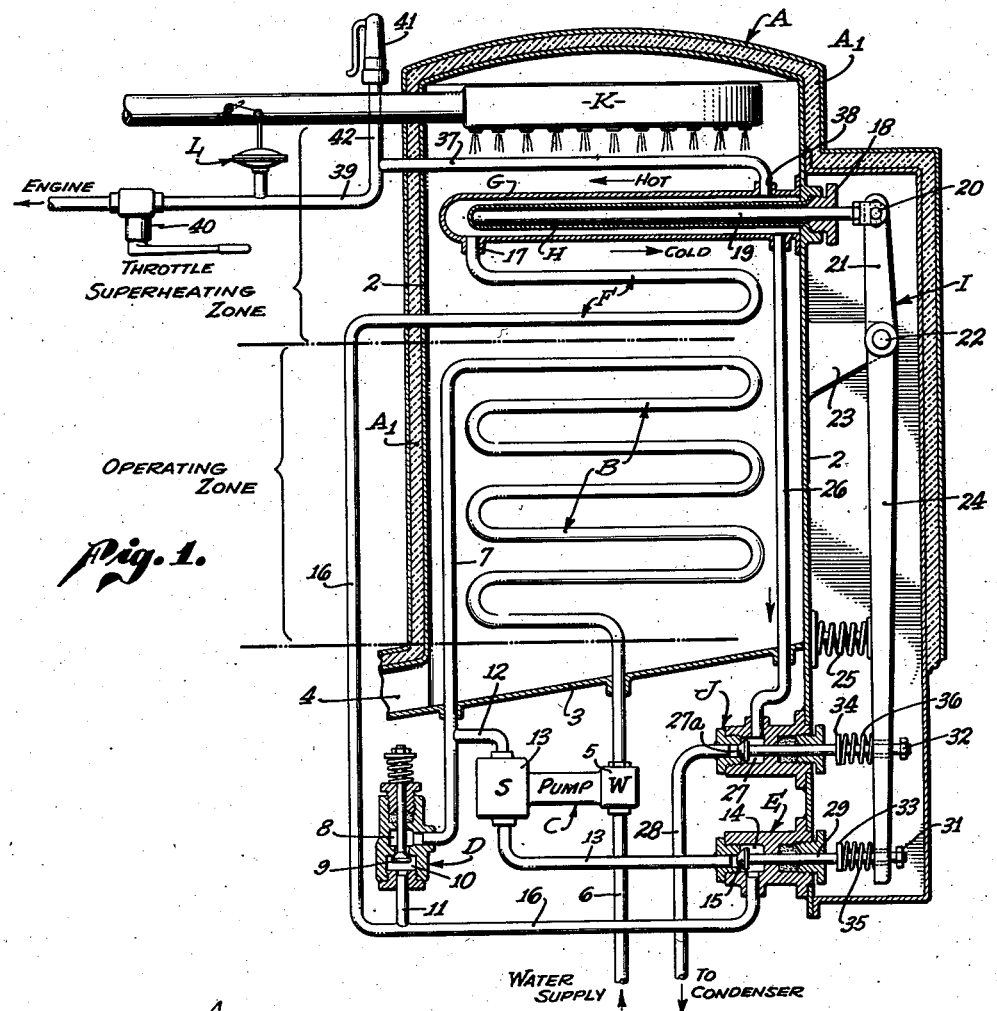
Figure 1 shows a sectional elevation of one form of the invention formed as a self contained unit comprising all of the necessary elements of the system and subdivided into two main zones, namely, an operating zone and a superheating zone, and arranged for producing power for a prime mover such as a steam engine.

Referring to Figure 1, I will now describe the structure and arrangement of the self contained steam generating unit embodied in the disclosure thereof. Preferably all of the elements of the unit are enclosed within a boiler housing A which is unlined but has an insulating jacket A1 forming a cover for the top and wall 2 but not necessarily the bottom 3. Said bottom is slightly inclined to one side of the boiler and has a drain outlet 4 by means of which the products of combustion and condensation may be drained from the boiler.

Within the operating zone of the boiler, I provide a coil B of suitable length which has its lower extremity connected with the exhaust side of the pumping end 5 of a steam operated water pump C, and water is supplied to the pump from a pipe 6 connected with the inlet side of the pump and leads to a source of continuous water supply. The upper end of coil B is connected by means of a section 7 with a chamber 8 of a relief valve D in which a spring closed valve 9 is mounted for regulating communication between chamber 8 and a chamber 10 externally of said valve and having an outlet 11. Section 7 of coil B also has a by-pass connection 12 in advance of valve unit D which connects with the steam inlet of the driving end of pump C. The steam outlet of pump C has a pipe 13 extended therefrom to a chamber 14 of a pump control valve unit E within which is mounted a valve 15 for controlling communication of pump C with chamber 14, as hereinafter described.

The superheating zone of the boiler has a coil F with a tube 16 leading from its lower extremity to and for connection with the outlet 11 of valve unit D and chamber 14 of valve unit E, while the upper end of coil F is connected at 17 with a tubular jacket G which is closed at both ends and is suitably supported on the wall 2 of the boiler A. Jacket G encloses a tubular thermostatic element H which is removably supported in said jacket by means of a plug 18, said plug being bored to slidably receive a rod 19 the inner end of which rests against the inner end of element H and the outer end of which is pivotally connected at 20 with an arm 21 of a control lever I. Said lever is pivotally mounted at 22 on a bracket 23 attached to the boiler A and has an elongated downwardly extended arm 24 which is suitably tensioned by means of a compression spring 25 held between arm 24 and the wall of the boiler for normally urging the arm 24 outwardly and the arm 21 and rod 19 inwardly so that the end of said rod will engage the inner end of element H and upon contraction of said element the lever I will be reversely and correspondingly operated against the tension of spring 25.

Jacket G has a downwardly extended connection 26 which affords communication between the interior of said jacket and a chamber 27 formed in a heat control valve unit J including a valve 27a seated in chamber 27 for normally closing a connection with a pipe 28 adapted to lead to a condenser (not shown). The valve stems 29 and 30 of valve units E and J, respectively, are elongated and their outer portions extend through arm 24 of lever I and carry nuts 31 and 32 adapted at times to engage the outer surface of said lever for the purpose of opening the valves 15 and 27a, respectively, in units E and J. Said valve stems have discs or collars 33 and 34 fixed thereto, respectively, between which and the adjacent side of arm 24 compression springs 35 and 36 are held on their respective stems so that when the arm 24 is inwardly of a predetermined position the associated valves will be held closed on their respective seats by reason of the tension of their springs. On the other hand, when the arm 24 moves outwardly from such position to a predetermined extent the valves 15 and 27a will be opened one after the other in the order named by the engagement of the surface of the arm with the nuts 31 and 32 under the influence of the element H as said element is expanded.

Jacket G has an outlet pipe 37 connected at 38 therewith which communicates with a pipe 39 in which a throttle valve 40 is connected for regulating the application of steam to a prime mover. A relief valve 41 is connected at 42 with pipes 37 and 39 for the emergency relieving of the steam pressure, especially when the throttle valve 40 is closed.

Heat is applied to the coils B and F and jacket G from a burner K at the top of the boiler and is of a down draft type so that initial application of heat will be to the jacket G and superheating coil F. The regulation of the burner is effected through the medium of a steam actuated diaphragm control means L of well known type and structure and in any suitable manner, so that the heat from the burner will be regulated to correspond to the boiler requirements.

The operation of the form of apparatus shown in Figure 1 is as follows: When the boiler is cold, it will be filled with water through the pump valve for the reason that the resident steam in the boiler will condense and form a partial vacuum which will induce a flow of water through pipe 6 and the pump to replace the steam. When the burner K is lighted and the water in the coil B is sufficiently heated, steam develops in the coil and pressure is created against the relief valve unit D and the driving end of pump C. The valve D requires a greater pressure for operation than the pump C and as a consequence when the pressure in coil B is sufficient to operate the pump, the exhaust pressure in pipe 13 will be great enough to open valve 15 of unit E, but should not be the case and valve 15 is held closed against pressure by the influence of the thermostatic element H pressure will be relieved through valve 9 of unit D and steam will be delivered through pipe 16 to the superheater jacket G and thence outwardly through pipe 37 for use when the throttle 40 is open, and when the throttle is closed excess pressure will be relieved through valve 41.

The superheating of the water and steam in jacket G effects the corresponding expansion of element H and the movement inwardly of rod 19 and the corresponding movement outwardly of arm 24 of lever I until the arm 24 engages nut 31 on stem 29 of valve 15 in unit E, thereby opening said valve and relieving pressure in the pump line whereby the pump may again be operative for supplying additional water to the boiler. It must, of course, be noted that maximum pressures obtain in the operating coil B of the operating zone while the superheating zone pressure is necessarily lower due to the fact that steam is being delivered, when the boiler is operating, for use in the prime mover.

Following the opening of valve 15, should the temperature in jacket G increase sufficiently, the heat generated in the jacket will be reflected through pipe 26 to chamber 27 of unit J, but in the meantime the overheat condition will have caused the arm 24 to move outwardly to a sufficient extent to open valve 27a of unit J so that steam resident in pipe 26 will be delivered through valve 27a and pipe 28 to a condenser not shown, thereby causing a flow of steam through pump unit C, resulting in coil B being replenished with water. Thus, as fresh cool water is supplied to the coil B, temperature in coil B is decreased as well as the ensuing and consequent temperature in coil F and jacket G, thereby effecting a contraction of the element H and a retraction of arm 24 so as to again close valves 27a and 15, in order, until again actuated by increasing heat.

Steam is delivered to the superheating zone whether through relief valve unit D or the pump C, as will be obvious, but the pump cannot operate until the valve of unit E is opened. Through the connections just described, it will be apparent that the pressure in the superheating zone and valve units D and E is equalized so that there are no opposing forces, except as may be otherwise described herein, which affect the operation of the generator and certainly none which prevent or retard the operation described and necessary to the efficient operation of the boiler. It is also worthy of note that it is not the pressure in the superheating zone which controls valve unit J but the heat therein, inasmuch as it is the heat only which effects the expansion and contraction of the element H which in turn effects the operation of lever I permitting the opening and closing of valves 15 and 27a.

Figure 2:
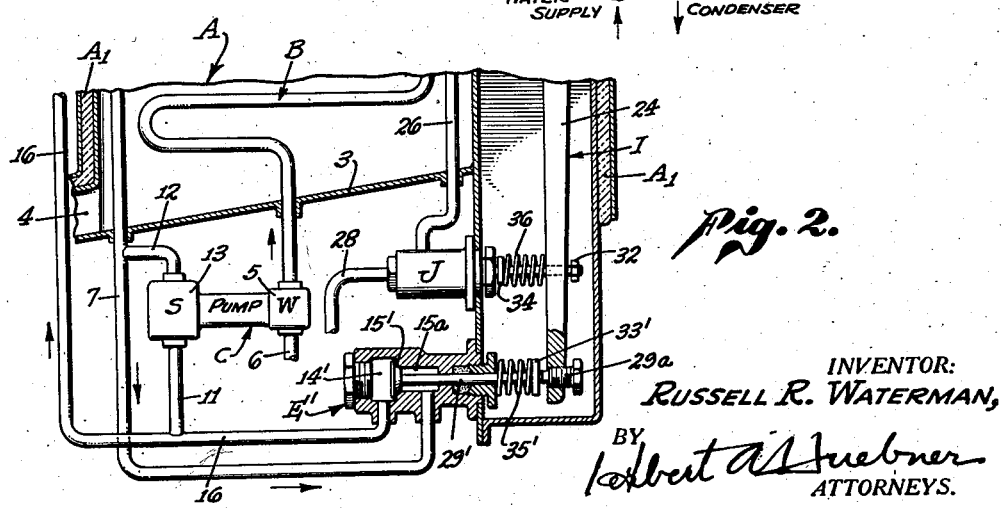
Figure 2 is a partial sectional elevation of a unit similar to that shown in Figure 1 but embodying certain modifications which tend to simplify the structure.

The modified form of boiler shown in Figure 2 differs from the structure of Figure 1 only in that it provides a single valve unit E' which combines the functions of the units E and D of Figure 1. For instance, the pipe 16 connects with the closing side of a valve 15' through an inlet chamber 14' instead of the opening side of the valve 15 into chamber 14, while pipe 7 connects with the opening side of valve 15' through a chamber 15a instead of the valve unit D. Also, the valve stem 29' does not extend through arm 24, as in Figure 1, but carries a head 33' at its outer end between which and the valve body a spring 35' is compressed. The outer end of stem 29' abuts an adjustable screw 29a carried near the end of arm 24.

The operation of the aforesaid modified form of apparatus is the same as in Figure 1 except that pressure in pipe 7 from coil B is relieved through the opening of valve 15' of unit E' independently of lever I, and valve 15' when open, serves to prevent the operation of pump C, as will be obvious. The thermostatic element H influences the operation of valve 15' to open it by reason of the engagement of the lever I therewith when the boiler is cold. When the valve is closed pressure may be built up in coil B to operate pump C, and the exhaust from the pump will be discharged into pipe 16 and thence upwardly to the superheating zone, as in the boiler of Figure 1.

Figure 3:
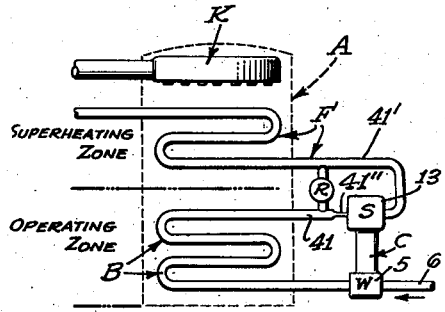
Figure 3 shows diagrammatically a system similar to that of Figure 1, except that the system is controlled by a proper proportioning of the heating areas in the operating and superheating zones and the elimination of certain features of the structure of Figure 1.

Figure 3 presents a simplified form of apparatus in which two zones—an operating and a superheating zone—are provided with due regard to exact and proper proportions of heating areas in the two zones. In this form of apparatus a relief valve R is connected between the steam inlet connection 41 and the steam outlet pipe 41' around the driving end of the pump C so that excess pressure generated in operating coil B will be relieved through pipe 41' to superheating coil F from which steam may be delivered for any use to any point. The pressure required to operate relief valve R being greater than that required to operate pump C, the pump will continue to supply water even when valve R is open.

Between relief valve R and the power end of pump S, a restricted orifice 41'' (either fixed or adjustable) is incorporated in pipe 41, the function of which is to control the speed of the pump by the difference in the volume of steam and water. If there is no steam generated in section B, there will be no movement of the pump; when a small amount of steam is generated in section B and there is considerable water therein, the water will not flow through the orifice 41'' as fast as steam, thereby causing the pump to operate slowly, the extra volume being by-passed through relief valve R; and the speed of operation will be increased in proportion to the amount of steam generated in section B. This function will cause the quality of the steam leaving the exhaust side of the pump to remain constant, thereby causing the temperature in coil F, to remain substantially constant.

Figure 4:
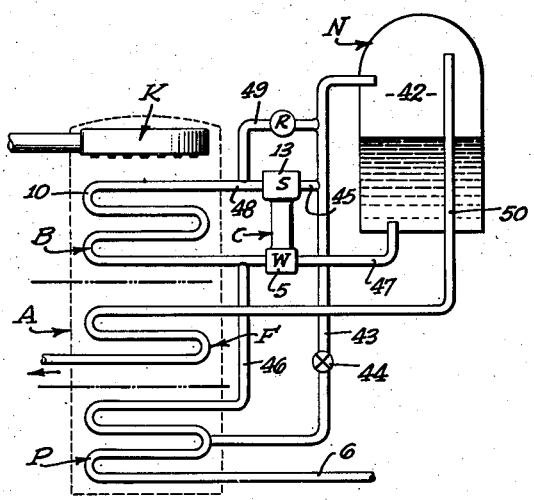
Figure 4 shows a diagram of a form of my system in which preheating, operating and superheating zones are provided, together with a recirculating boiler and a circulating means.

As shown in Figure 4, a still different arrangement of the boiler elements is provided which includes a reserve drum N arranged for holding a substantial volume of water in the lower portion thereof and for holding steam under pressure in its upper portion. In this form of apparatus there are three zones—preheating, superheating and operating arranged vertically of the apparatus in the order named, or otherwise. In the preheating zone is a coil P which is connected with the water supply pipe 6, and by a pipe 43 also has a connection at a medial point, preferably though not necessarily, with the steam chamber 42 of drum N, a manually operable shut-off valve 44 being interposed in pipe 43 at a point between coil P and a connection 45 with the driving end of pump C.

Coil P connects with operating coil B through the medium of a pipe 46 beyond the exhaust side of the pumping end 5 of pump C so that when the pump is operating, water may be supplied by said pump from the reserve reservoir in boiler N through a pipe 47 leading to the water intake side of the pump, and also to coil B. Pump C is operated by steam supplied from coil B through a connection 48, and there is also provided a relief valve R through a bypass 49 connecting with pipe 43. Steam for operating purposes is delivered from drum N outwardly through a pipe 50 in communication with the steam chamber 42 and with a superheating coil F from which the steam ultimately passes to and for operating a prime mover or for other purposes.

Thus, I have provided a comprehensive apparatus capable of affording adequate and proper circulation of water and steam through the several elements of the apparatus as well as recirculation of said elements when and as required for advantageous use in the operation of the system. In other words I have provided a circulating means applicable to a reserve drum which is under pressure and temperature but which is located externally of and is apart from the boiler proper and outside of the heated area, and which is capable of holding a substantial volume of water as a reserve supply. This form of apparatus is particularly adapted for use where heavy duty acceleration is required. Preferably, the steam generated in coil B is introduced into the drum N at a tangent to facilitate separation of water from steam.

Figure 5:
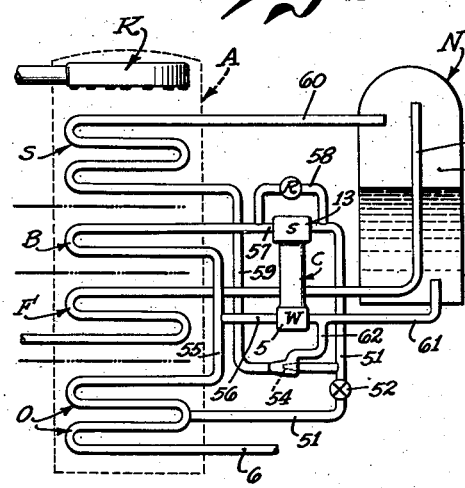
Figure 5 is a diagram of a system similar to Figure 4 except that an ejector is employed by which steam pressure from the operating zone is utilized for forcing water from the reserve water drum into an evaporating zone and back into the drum.

A somewhat modified form of apparatus is shown in Figure 5 which in the main conforms to that of Figure 4 but has some additional features as will appear from the following description thereof. One difference consists in the provision of means for discharging steam under pressure from the operating zone into and through an ejector which forces water from the drum N into and through an evaporating zone and thence back into the drum. Therefore, there are four zones arranged upwardly in order from the bottom, namely, preheating, superheating, operating and evaporating. The preheating coil O receives water from a supply pipe 6 and is connected by a pipe 51 with the exhaust steam side of pump C and has a back by-pass valve 52 therein in advance of its connection 53 with an ejector 54.

Preheating coil O is connected at 55 with operating coil B and also at 56 with the water exhaust of pump C, while coil B connects at 57 with the steam intake of said pump, steam being exhausted from the pump into pipe 51 and a relief valve R being cross-connected around the pump by means of a pipe 58 in which the relief valve is intermediately mounted between the terminal connections of the pipe 58. Exhaust steam from pump C is discharged through pipe 51 and connection 53 into ejector 54 and thence through a pipe 59 to and through an evaporating coil S having a connection with the chamber 42 of receptacle N through a pipe 60. Water for the pump is withdrawn from the bottom of receptacle N through a feed pipe 61. As in the case of the form of apparatus shown in Figure 4, steam for operating usage is delivered through the pipe 50 through superheating coil F. Ejector 54 connects with pipe 61 by means of a pipe 62, so that exhaust steam from the pump, by reason of the ejector 54, will draw water from the receptacle N and force its recirculation through the evaporating zone.

Figure 6:
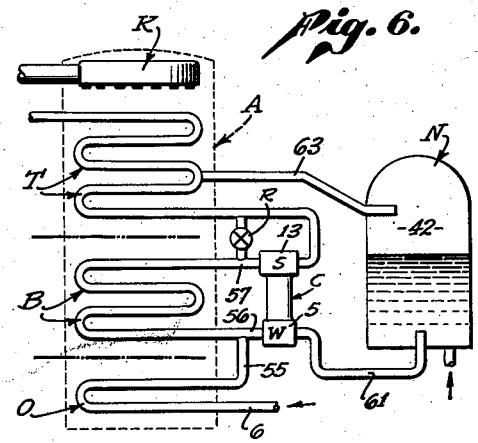
Figure 6 is a diagram of a system including a flash boiler with a reserve supply and subdivided into preheating, operating and flash zones.

In Figure 6 is shown an adaptation of the system of Figure 5 but includes a flash boiler with a reserve water supply in which the ejector is omitted and a flash coil T is provided and has its lower end connected with the steam exhaust of the pump and its upper end arranged for connection with a steam delivery means for applying the generated steam for any use. In this form the relief valve R is cross connected between the coils B and T and coil T is connected at a suitable point with the reserve receptacle N by means of a pipe 63.

Figure 7:
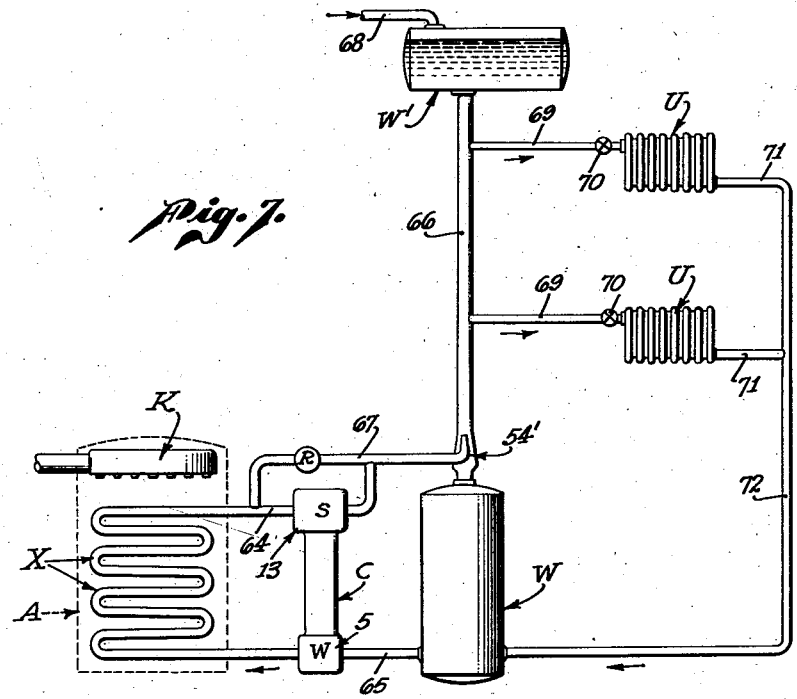
Figure 7 is a diagram of a hot water heating system embodying my invention and arranged to force the circulation of hot water through a heating system by steam pressure.

My system is also applicable in modified form to modern hot water heating systems as shown in Figure 7, to which reference is now made. A coil X is provided within the boiler A together with the usual burner K by means of which the water in the coil is primarily heated and in which coil pressure is generated for operating pump C. The upper end of coil X is connected with the driving end 13 of the pump through a connection 64 while the lower end of the coil is connected with the pumping end of pump C, the intake side of which is in turn connected by a pipe 65 with the bottom of a water tank W. The steam exhaust outlet of pump C connects with an ejector 54' which is interposed between tank W and a riser pipe 66 serving as a distributing means for a building. A relief valve R is cross connected between the steam and exhaust sides of the pump by means of a connection 67 in which valve R is interposed. Distributing pipe 66 may terminate in a water reserve tank W' having a water supply inlet 68. Intermediate the tanks W and W' the usual room radiators U, U, etc., are individually connected by pipes 69, 69, etc., and may have the usual shut off valves 70 for regulating the operation of the radiators. The exhaust sides of the radiators are connected by pipes 71 with a common return 72 which leads to the bottom of the water tank W.

The operation of the water heating system will be apparent, inasmuch as the pressure of hot water and steam generated in coil X operates pump C for forcing steam and water through the ejector 54' and riser 66 while water is drawn from tank W to maintain the circulation of the water in the system. The reserve water supply tank W' serves to keep the tank W full at all times. The water, of course, freely circulates through the system and is returned to tank W for reheating and recirculation through the elements of the system.

Figure 8:
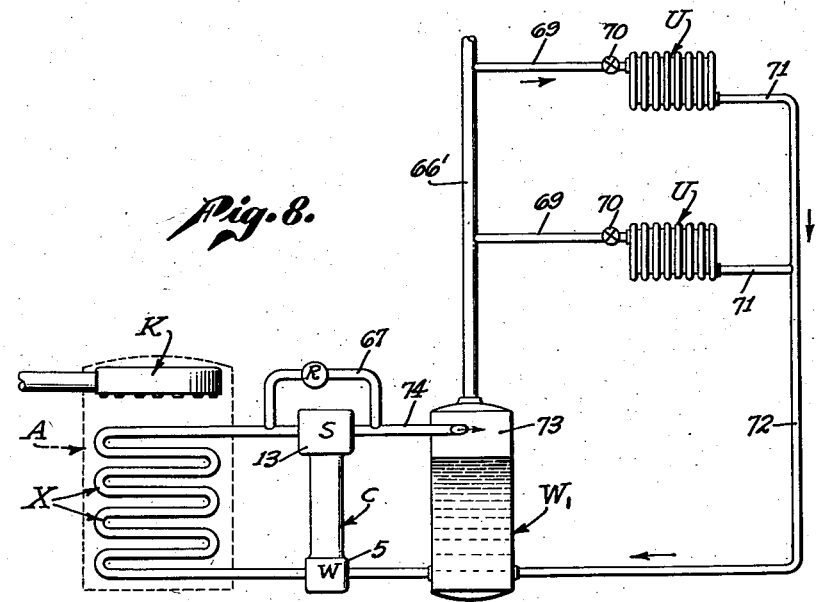
Figure 8 is a diagram of a steam heating system wherein the steam is circulated through a steam heating apparatus embodying a plurality of units, and giving instantaneous heat to the room radiators.

The steam heating system shown in Figure 8 is similar to the hot water circulating system of Figure 7 except that the exhaust steam side of the pump C is connected with the steam chamber 73 of a water tank $W_1$ and the ejector and reserve water tank are omitted from the system, the riser 66' being connected with steam chamber 73 of tank $W_1$, and the radiators U being connected with the system as shown in Figure 7. Both the hot water and steam heating systems of figures 7 and 8 are designed for efficiently forcing hot water and steam through the connections and for affording free and proper circulation of said elements.

An important feature of my system consists in the method of feeding the water supply to the boiler at the same rate, by volume, at which the steam is discharged. My system, therefore, differs from conventional systems which are more or less unstable in that they depend upon the operation of the feed pump either by the prime mover or some auxiliary power plant which, in its operation, occasions unstability and uncertainty of control of the heat balance of the boiler, due primarily to the variable steam requirements which do not correspond to the variable speed requirements of the prime mover.

The recirculating features of my system which have been hereinbefore described are of the forced circulation type in which there is always more water in circulation through the coils than the total heat will evaporate. Under such conditions it will be apparent that the temperature cannot rise above saturated steam temperature in the operating zone. The super heat temperature is maintained constant by quantitative relation between the superheatable surface, the quantity of heat applied thereto, and the amount of steam used. Hence, the inherent heat balance in the boiler tubes is maintained regardless of the intensity of the fire.

Such a system of forced circulation requires the use of but a very small boiler of such size and weight which will adapt it for use under the hood of a conventional car, truck or bus, and also its installation in an aeroplane. The sole regulator in my improved type of recirculating generator is a pressure regulator shown at L which is effective for controlling the fire to an extent and in such a manner as to provide and maintain a constant operating pressure. The water feed system requires no control whatever and is, in effect as simple as the water circulating system of a conventional automobile.

In the ejector type of boiler shown in Figure 5, the operating coil B serves as a constant source of energy for effecting the operation of the ejector and is independent of the feed water supply, while the relief valve R is employed for regulating the maximum pressure permitted in said coil. In this form of apparatus the backward by-pass valve 52 may be either manually or automatically operable for effecting the circulation of water through the preheater coil O in order to protect same during a firing up period.

As illustrative of the operating temperatures suitable in my generator and the conditions prevailing at different temperatures the following example is given:

With a temperature of 700 degrees F. the pump C is inoperative but said pump will start to operate at approximately 750 degrees F. when the throttle 40 is open and will continue to operate as long as the temperature remains above 750° F. However, when the throttle is closed, the pump remains inoperative until the temperature reaches approximately 850° F., at which time the valve 27a (Figure 1) is opened and allowing a flow of steam through pipe 28 to condenser. This flow of steam in turn causes pump C to operate and supply water to coil B until the temperature has been lowered to the proper point, as hereinbefore described. Of course the above conditions may be modified by circumstances not now known to me and not material to this invention.

An overhot condition, which might occur from leakage of steam through a closed or almost closed throttle, arising from loss or consumption of steam insufficient to operate the pump, but eventually requiring more water in the operating zone, is provided for by the valve J and associated parts shown in Figures 1 and 2, which causes circulation of steam through the pump C adequate for operation of the pump.

Having described my invention, what I claim as new and desire to secure by Letters Patent is:

1. A boiler comprising: an operating coil, means for applying heat to said coil, a source of water, a pressure operated pump having its pumping element disposed between said source and the intake section of said coil and its driving element disposed in the delivery section of said coil, whereby pressure generated in the coil will operate the pump to supply water to the coil, and a relief valve in the delivery section of said coil parallel to the driving element set to be opened by a pressure greater than that necessary to operate the said driving element.

2. A boiler comprising: an operating coil, means for applying heat to said coil, a source of water, a pressure operated pump having its pumping element disposed between said source and the intake section of said coil and its driving element disposed in the delivery section of said coil, whereby pressure generated in the coil will operate the pump to supply water to the coil when steam or hot water is being normally delivered from said coil, and a heat controlled valve connected with the exhaust side of the pump driving element to cause substantially normal delivery of feed to maintain a constant temperature, and means to relieve pressure in said coil when said pump is not operating or when it does not require all the pressure being generated for its operation.

3. A boiler comprising: an operating coil, means for applying heat to said coil, a source of water, a pressure operated pump having its pumping element disposed between said source and the intake section of said coil and its driving element disposed in the delivery section of said coil, a valve at the exhaust side of said driving element adapted to be opened for operation of said driving element and closed to stop the same, and heat controlled means to operate the valve, and means to relieve pressure in said coil when said pump is not operating or when it does not require all the pressure being generated for its operation.

4. The combination of: a liquid heating coil having an intake end and a delivery end, means for heating said coil, a liquid supply pump at the intake end having its driving element interposed in the delivery end of said coil and exhausting fluid heated in said coil for further use when operating, means controlling the operation of said pump, a by-pass around said pump for delivering fluid heated in said coil when said pump is not operating or when said pump does not require all the volume being heated for its operation, and flow control means in said by-pass.

5. The combination of: a liquid heating coil circuit having an intake end and a delivery end, means for heating said coil, a liquid supply pump at the intake end having its driving element interposed in the delivery end of said coil and exhausting fluid heated in said coil for further use when operating, means associated with the delivery end of said coil and with the exhaust side of said pump for controlling the operation of said pump, a by-pass around said pump for delivering fluid heated in said coil when said pump is not operating or when said pump does not require all the volume being heated for its operation, and flow control means in said by-pass.

6. The combination of: a liquid heating coil having an intake end and a delivery end, means for heating said coil, a liquid supply pump at the intake end having its driving element interposed in the delivery end of said coil and exhausting fluid heated in said coil for further use when operating, a valve at the exhaust side of the driving element of said pump adapted to open and permit flow through the driving element of the pump for operating same, thermostatic means controlling said valve, a by-pass around said pump for delivering fluid heated in said coil when the pump is not operating or when said pump does not require all the volume being heated for its operation, and flow control means in said by-pass.

7. The combination of: a liquid heating coil having an intake end and a delivery end, means for heating said coil, a liquid supply pump at the intake end having its driving element interposed in the delivery end of said coil and exhausting fluid heated in said coil for further use when operating, a valve at the exhaust side of the driving element of said pump adapted to open and permit flow through the driving element of the pump for operating same, thermostatic means controlling said valve, a by-pass around said pump for delivering fluid heated in said coil when the pump is not operating or when said pump does not require all the volume being heated for its operation, and a pressure valve in said by-pass overbalanced against said pump to remain closed when said pump is operating and requires the full volume of heated fluid to operate and to open when said pump is not operating or when said pump does not require all the volume being heated for its operation.

8. The combination of: a liquid heating coil having an intake end and a delivery end, means for heating said coil, a liquid supply pump at the intake end having its driving element interposed in the delivery end of said coil and exhausting fluid heated in said coil for further use when operating, means controlling the operation of said pump comprising a by-pass around said pump and a valve in said by-pass, said valve when closed stopping said by-pass and causing fluid heated by said coil to pass through said pump and operate same and when open permitting flow of fluid heated by said coil through said by-pass and depriving said pump of heated operating fluid, and spring means to close said valve for operation of said pump but yielding as a relief valve when the pump is not operating or does not require all the volume being heated for its operation.

9. The combination of: a liquid heating coil having an intake end and a delivery end, means for heating said coil, a liquid supply pump at the intake end having its driving element interposed in the delivery end of said coil and exhausting fluid heated in said coil for further use when operating, means controlling the operation of said pump comprising a by-pass around said pump and a valve in said by-pass, said valve when closed stopping said by-pass and causing fluid heated by said coil to pass through said pump and operate same and when open permitting flow of fluid heated by said coil through said by-pass and depriving said pump of heated operating fluid, spring means to close said valve for operation of said pump but yielding as a relief valve when the pump is not operating or does not require all the volume being heated for its operation, and thermostatic controlled means adapted to overcome said spring means and open said valve to retard or prevent operation of said pump.

10. A vapor generating system comprising: fluid conducting means, means for applying heat to said fluid conducting means, a liquid supply pump having its driving element disposed in the delivery section of said conducting means and supplied by fluid pressure flowing through said fluid conducting means and its pumping element connected with the intake end of said fluid conducting means, valve means on the exhaust side of said pump controlling the flow of fluid through said pump and thereby the operation of said pump, and means delivering fluid utilized in driving said pump to said fluid conducting means.

11. A vapor generating system comprising: fluid conducting means, means for applying heat to said fluid conducting means, a liquid supply pump having its driving element supplied by fluid pressure flowing through said fluid conducting means and its pumping element connected with the intake end of said fluid conducting means, valve means on the exhaust side of said pump controlling the flow of fluid through said pump and thereby the operation of said pump, a throttle for releasing heated fluid for normal consumption whereby flow is provided through the driving element of said pump, a stand-by outlet for releasing heated fluid to cause flow through the driving element of said pump when the throttle is closed or insufficiently open to provide such flow, and means actuated by excessive heat in said fluid conducting means to open said stand-by outlet.

12. The combination of: a liquid heating coil having an intake end and a delivery end, means for heating said coil, a liquid supply pump at the intake end having its driving element interposed in the delivery end of said coil and exhausting fluid heated in said coil for further use when operating, means controlling the operation of said pump said means including a throttle for releasing heated fluid for normal consumption whereby flow is provided through the driving element of said pump, a stand-by outlet for releasing heated fluid to cause flow through the driving element of said pump when the throttle is closed or insufficiently open to provide such flow, means actuated by excessive heat in said coil to open said stand-by outlet, a by-pass around said pump for delivering fluid heated in said coil when said pump is not operating or when said pump does not require all the volume being heated for its operation, and flow control means in said by-pass.

13. The combination of: a liquid heating coil having an intake end and a delivery end, means for heating said coil, a liquid supply pump at the intake end having its driving element interposed in the delivery end of said coil and exhausting fluid heated in said coil for further use when operating, means controlling the operation of said pump comprising a by-pass around said pump and a valve in said by-pass, said valve when closed stopping said by-pass and causing fluid heated by said coil to pass through said pump and operate same and when open permitting flow of fluid heated by said coil through said by-pass and depriving said pump of heated operating fluid, and spring means to close said valve for operation of said pump but yielding as a relief valve when the pump is not operating or does not require all the volume being heated for its operation, a throttle for releasing heated fluid for normal consumption whereby flow is provided through the driving element of said pump, a stand-by outlet for releasing heated fluid to cause flow through the driving element of said pump when the throttle is closed or insufficiently open to provide such flow, and means actuated by excessive heat in said fluid conducting means to open said stand-by outlet.

14. The combination of: a liquid heating coil having an intake end and a delivery end, means for heating said coil, a liquid supply pump at the intake end having its driving element interposed in the delivery end of said coil and exhausting fluid heated in said coil for further use when operating, means controlling the operation of said pump comprising a by-pass around said pump and a valve in said by-pass, said valve when closed stopping said by-pass and causing fluid heated by said coil to pass through said pump and operate same and when open permitting flow of fluid heated by said coil through said by-pass and depriving said pump of heated operating fluid, spring means to close said valve for operation of said pump but yielding as a relief valve when the pump is not operating or does not require all the volume being heated for its operation, thermostatic controlled means adapted to overcome said spring means and open said valve to retard or prevent operation of said pump, a throttle for releasing heated fluid for normal consumption whereby flow is provided through the driving element of said pump, a stand-by outlet for releasing heated fluid to cause flow through the driving element of said pump when the throttle is closed or insufficiently open to provide such flow, and means actuated by excessive heat in said fluid conducting means to open said stand-by outlet.

15. A boiler feed-water supply system comprising a steam pump having its pumping end drawing from an outside source of supply and delivering to the boiler, a steam outlet line from the boiler, a throttle valve in the line, the pump including a steam operating member; an inlet pipe leading from the line to the member, an outlet pipe leading from said member back to the line, and a pressure control valve interposed in the line between the connection of said pipes therewith and set to resist passage of steam therepast at a pressure higher than that of the steam in the outlet pipe.

16. The method of supplying water to a boiler from a source of supply, comprising arranging a pump to draw from said supply and to deliver to the boiler, operating the pump by steam from the boiler only when steam is being taken from the boiler for use elsewhere, and restricting the passage of steam to the pump without preventing the passage of steam to the point of use and so as to cause the pump to operate at a relatively slow speed when the viscosity of the steam is high and at a relatively high speed when the viscosity of the steam is low.

17. A boiler feed-water supply system comprising a steam pump having its pumping end drawing from an outside source of supply and delivering to the boiler, the pump including a steam operating member, a steam outlet line from the boiler having by-passing connection with the inlet and exhaust of said member, and a throttle valve in the line whereby the functioning of the pump is controlled by the throttle setting, and flow restricting means for the steam passing through the pump.

RUSSELL R. WATERMAN.